(12) United States Patent
Schroeder

(10) Patent No.: US 8,235,595 B2
(45) Date of Patent: *Aug. 7, 2012

(54) GUIDE RAIL AND METHOD FOR MANUFACTURING SAME

(75) Inventor: Robert Schroeder, Machesney Park, IL (US)

(73) Assignee: Pacific Bearing Company, Rockford, IL (US)

(*) Notice: Subject to any disclaimer, the term of this patent is extended or adjusted under 35 U.S.C. 154(b) by 358 days.

This patent is subject to a terminal disclaimer.

(21) Appl. No.: 12/690,509

(22) Filed: Jan. 20, 2010

(65) Prior Publication Data

US 2010/0239192 A1 Sep. 23, 2010

Related U.S. Application Data

(63) Continuation-in-part of application No. 12/398,205, filed on Mar. 5, 2009, now Pat. No. 8,029,193.

(60) Provisional application No. 61/034,540, filed on Mar. 7, 2008.

(51) Int. Cl.
*F16C 29/06* (2006.01)
*B21D 53/10* (2006.01)

(52) U.S. Cl. ............................ 384/55; 384/43

(58) Field of Classification Search .............. 384/43–45; 29/898.03
See application file for complete search history.

(56) References Cited

U.S. PATENT DOCUMENTS

| | | |
|---|---|---|
| 1,500,116 A | 7/1924 | Dowd |
| 3,900,233 A | 8/1975 | Thomson |
| 4,025,995 A | 5/1977 | Thomson |
| 4,635,331 A | 1/1987 | Walter et al. |
| 5,059,037 A | 10/1991 | Albert |
| 5,217,308 A | 6/1993 | Schroeder |
| 5,289,779 A | 3/1994 | Ohya et al. |
| 5,431,498 A | 7/1995 | Lyon |
| 5,755,516 A | 5/1998 | Teramachi et al. |
| 5,800,065 A | 9/1998 | Lyon |
| 5,930,898 A | 8/1999 | Lyon |
| 6,052,902 A | 4/2000 | Lyon |
| 6,086,254 A | 7/2000 | Lyon |
| 6,484,599 B2 | 11/2002 | Blaurock |
| 6,508,589 B2 | 1/2003 | Kashiwagi et al. |
| 7,300,208 B2 | 11/2007 | Kuellstaedt et al. |
| 2001/0012417 A1 | 8/2001 | Kashiwagi et al. |
| 2005/0169559 A1 | 8/2005 | Mochizuki et al. |
| 2005/0232521 A1 | 10/2005 | Kuellstaedt et al. |
| 2005/0281497 A1 | 12/2005 | Akiyama et al. |
| 2006/0078237 A1 | 4/2006 | Ishihara |
| 2008/0013871 A1 | 1/2008 | Kuellstaedt et al. |

FOREIGN PATENT DOCUMENTS

DE 1 222 322 8/1966

(Continued)

*Primary Examiner* — Thomas R Hannon
(74) *Attorney, Agent, or Firm* — Reinhart Boerner Van Deuren P.C.

(57) ABSTRACT

A guide rail includes a base rail with at least one finger extending from a first portion of the base rail, and at least one finger extending from a second portion of the base rail. A race insert is mounted against the fingers. A first race way is associated with the at least one finger extending from the first portion of the base rail. A second race way is associated with the at least one finger extending from the second portion of the base rail. The first and second race ways have different load transmission directions. The load transmission direction of the first race way is non-parallel to the at least one finger extending from the first portion of the base rail. The load transmission direction of the second race way is non-parallel to the at least one finger extending from the second portion of the base rail.

28 Claims, 2 Drawing Sheets

FOREIGN PATENT DOCUMENTS

| | | |
|---|---|---|
| DE | 3504061 | 8/1986 |
| DE | 44 28 558 | 2/1996 |
| EP | 0213160 | 3/1987 |
| EP | 0 258 714 | 3/1988 |
| EP | 0 353 396 | 2/1990 |
| JP | 07-217651 | 8/1995 |
| JP | 2007-046691 | 2/2007 |
| KR | 10-2007-0090920 | 9/2007 |
| WO | WO 86/04651 | 8/1986 |
| WO | WO 2006/061076 | 6/2006 |

GUIDE RAIL AND METHOD FOR MANUFACTURING SAME

CROSS-REFERENCE TO RELATED PATENT APPLICATIONS

This patent application is a continuation-in-part of co-pending U.S. patent application Ser. No. 12/398,205, filed Mar. 5, 2009. This patent application claims the benefit of U.S. Provisional Patent Application No. 61/034,540, filed Mar. 7, 2008, the entire teachings and disclosures of which are incorporated herein by reference thereto.

FIELD OF THE INVENTION

This invention generally relates to guide rails and more particularly guide rails including a base rail including at least one raceway insert.

BACKGROUND OF THE INVENTION

Guide rails are used as a bearing and guide to support and direct the movement of a carriage, also known as a saddle, mounted to the guide rail. In some embodiments, the carriages will include metal rollers or guide wheels that ride on raceways of the guide rail.

As technology continues to strive to reduce weight, manufacturing time and manufacturing costs (with an emphasis on material costs) while maintaining structural integrity and tolerancing, numerous guide rail configurations have been developed.

One particular configuration is the use of a base rail formed of a lighter weight, cheaper base material such as aluminum onto which harder, more wear resistant, and accurately toleranced raceways are mounted.

For example, U.S. Pat. No. 5,800,065 to Lyon teaches providing an extruded base member including a longitudinal groove on opposite sides of the base member. A carriage race is inserted into each of the grooves. The teachings and disclosure of U.S. Pat. No. 5,800,065 are hereby incorporated in its entirety by reference thereto.

U.S. Pat. No. 7,300,208 to Kuellstaedt teaches a similar guide rail that includes support ribs formed in the bottom of the grooves of the base member that are deformed during assembly of the guide rails. U.S. Pat. No. 7,300,208 emphasizes the importance of having the support ribs substantially parallel to the load transmission direction of the race. This configuration allows the support ribs to deform in a mushroom pattern with a portion of the rib deforming to both sides of the rib and permits, generally, placing the support ribs in a state of compression rather than bending. Further, these ribs extend at an angle relative to the direction in which the race is roller inserted into the grooves of the base member. The teachings and disclosure of U.S. Pat. No. 7,300,208 are hereby incorporated in its entirety by reference thereto.

Embodiments of the present invention provide improvements over the guide rails taught by U.S. Pat. No. 5,800,065, and by U.S. Pat. No. 7,300,208.

BRIEF SUMMARY OF THE INVENTION

The present invention has several aspects that may be claimed and stand as patentable independently and individually or in combination with other aspects, including but not limited to the following.

In one embodiment of the invention, a guide rail that includes a base rail, at least one finger extending from a first portion of the base rail, and at least one finger extending from a second portion of the base rail. An embodiment of the guide rail further includes a race insert mounted against the plurality of fingers, where the race insert has a first and second race way. The first race way is associated with the at least one finger extending from the first portion of the base rail, and the second race way is associated with the at least one finger extending from the second portion of the base rail. Further, the first and second race ways have different load transmission directions, such that the load transmission direction of the first race way is non-parallel to the at least one finger extending from the first portion of the base rail, and the load transmission direction of the second race way is non-parallel to the at least one finger extending from the second portion of the base rail.

In another embodiment of the invention, a method of forming a guide rail that includes the steps of forming, within a base rail, a first groove, wherein the first groove has a first portion and a second portion, each portion having one or more fingers extending laterally away from the first groove, and mounting a race insert having two race ways into the first groove such that the race insert is pressed into contact with each of the one or more fingers. In at least one embodiment, mounting the race insert includes bending each of the one or more fingers in the first and second portions such that each of the one or more fingers is biased against the race insert.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
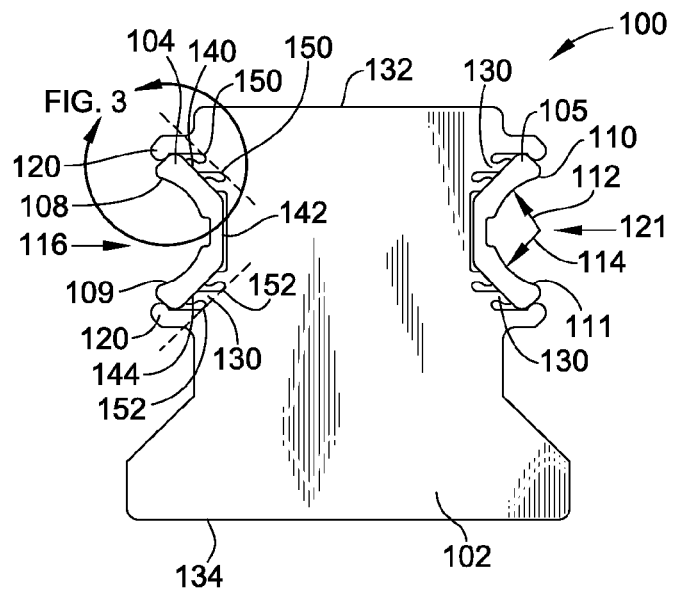
FIG. 1 is an exemplary embodiment of a guide rail in accordance with the teachings of the present invention.

FIG. 1 illustrates an embodiment of a guide rail 100 according to the teachings of the present invention. The guide rail 100 includes a base rail 102 and a pair of race inserts 104, 105 mounted to the base rail 102. The base rail 102 is preferably formed from a lighter and/or softer material than the race inserts 104, 105. Typically, the base rail 102 is an extrusion formed from aluminum and the race inserts 104, 105 are a steel or other wear-resistant material.

In an embodiment of the invention, the race inserts 104, 105 form a gothic arch profile, which includes race ways 108-111. As is known in the art, a ball bearing (not shown) carried by the raceways 108-111 will only contact each of the race ways 108-111 at a single point when using a gothic arch profile. Further, as is more fully described in U.S. Pat. No. 7,300,208, such a race insert 104, 105 includes two load transmission lines that extend at an angle relative to one another. These load transmission lines are illustrated by arrows 112, 114. However, as outlined below, other designs and profiles may be used while remaining within the scope of the present invention.

Figure 2:
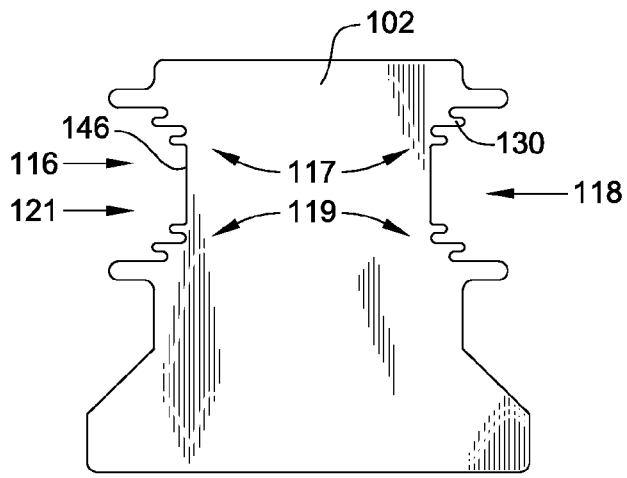
FIG. 2 is an end illustration of the base rail of the guide rail of FIG. 1.

The race inserts 104, 105 are mounted in grooves 116, 118 formed in opposing sides of the base rail 102. The base rail 102 includes four tabs 120. The grooves 116, 118 are defined as those portions of the base rail 102 between the two tabs 120 on the left side of the base rail 102, and between the two tabs 120 on the right side of the base rail 102. In the embodiment of FIGS. 1 and 2, the shape of the grooves 116, 118 is generally concave with respect to the base rail 102. Typically, tabs 120 are swaged over the ends of the race inserts 104, 105 to secure the race inserts 104, 105 within the grooves 116, 118. When assembling the guide rail 100, the race inserts are inserted laterally into the grooves 116, 118 along a direction illustrated generally by arrow 121.

Each of the grooves 116, 118 has a first portion 117 and a second portion 119. The grooves 116, 118 further include biasing fingers 130 such that each of the first and second portions 117, 119 includes at least one finger 130, wherein, collectively, the fingers 130 are configured to support the race inserts 104, 105. The grooves 116, 118 further include biasing fingers 130 that support the race inserts 104, 105. Prior to assembly of the guide rail 100, the fingers 130 extend generally parallel to one another, and parallel to the direction of insertion, i.e., arrow 121, and laterally outward from the base of grooves 116, 118. In this configuration, the fingers 130 are non-parallel with load transmission lines 112, 114.

During mounting of the race inserts 104, 105, the race inserts are inserted along the direction of arrow 121. During this process, a sufficient force is applied to the race inserts 104, 105 to cause the fingers 130 to deform substantially under a state of bending. More particularly, the fingers 130 associated with a top portion 110 of race insert 104, 105 bend toward the top 132 of the base rail 102 and therefore deform away from the bottom portion 111 of the race insert 104, 105. Similarly, the fingers 130 associated with a bottom portion 111 of race insert 104, 105 bend toward the bottom 134 of the base rail 102 and, therefore, deform away from the top portion 110 of the race insert 104, 105. Thus, the fingers 130 associated with the top portion 110 of the race insert 104, 105 bend away from the fingers 130 associated with the bottom portion 111 of the race insert 104, 105. During this assembly, the fingers are cammed against the back surfaces of the race inserts 104, 105 to cause the fingers to bend. In other words, the tips of the fingers contact the back surface of the race inserts 104, 105 and then as the race inserts 104, 105 are continually pushed into the grooves, the fingers 130 slide along back surface of the race inserts 104, 105 and are bent.

By placing the fingers 130 in a state of bending, it is contemplated that a more controlled deformation of the fingers 130 can be accomplished. As such, tolerancing of the race ways 108-111 is believed to be more accurately controlled. In some embodiments, the extent of bending the fingers 130 is between about 5 degrees and 35 degrees. Further, the bending may be more arcuate in nature than is illustrated in the figures.

With reference to FIG. 2, it will be noted that the configuration of the illustrated embodiment is free of undercuts between adjacent ones of the fingers 130 which can assist in the event that the fingers 130 are machined into the base rail 102. In such an arrangement, a grinder having a rotating axis extending perpendicularly to the insertion direction 121 can be used so that all of the fingers are cut with a grinding wheel rotating in the same direction. Thus, all material for each finger will be exposed to similar machining characteristics. If undercuts were provided, the grinding wheel would have to be inserted with an axis of rotation generally parallel to insertion direction 121 such that the top portion and bottom portion of fingers 130 would be ground by opposite sides of a wheel, which can provide different machining characteristics to the fingers 130, such as material flow directions.

Figure 3:
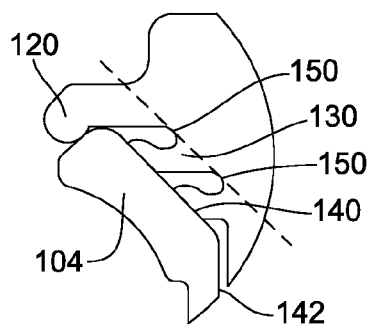
FIG. 3 is an enlarged partial illustration of the guide rail of FIG. 1 illustrating the mounting arrangement of a race insert mounted to the base rail.

In the illustrated embodiment of FIGS. 1-3, each race insert 104, 105 includes first, second and third back surface segments 140, 142, 144 (numbered and discussed in terms of race insert 104). The first and third back surface segments 140, 144 extend at non parallel and non-perpendicular angles to second back surface segment 142. In the illustrated embodiment, the first and third back surface segments 140, 144 face away from one another.

Prior to deformation of fingers 130 that associate with the first back surface 140, the tips of the fingers 130 generally are aligned at an angle relative to the bottom of the mounting groove 146 (see FIG. 2) that is approximately the same angle as the first back surface segment 140 aligns with the second back surface segment 142. The same arrangement is true with regard to the fingers 130 that associate with the third back surface 144. As such, a first line segment 151 passing through bases 150, and a second line segment 153 passing through bases 152 where the fingers 130 extend from are approximately parallel to the corresponding first or third back surface segments 140, 144.

Further, in the illustrated embodiment, no fingers 130 engage the second back surface 142. This is because back surface 142 is generally perpendicular to insertion direction 121. The use of fingers 130 to contact these regions would result in the fingers being axially mushroomed and placed into a state of compression rather than a state of bending as discussed previously.

As such, each of the fingers 130 extend laterally outward approximately the same distance. This distance is measured on a same side of the fingers 130 in which the fingers will be bent during insertion of the race inserts 104, 105. This arrangement promotes substantially constant bending forces throughout the various fingers 130 during assembly of the guide rail 100. This substantially constant distance is illustrated in FIG. 2. Further, as the fingers 130 are not compressed or mushroomed, the thickness of the fingers 130, perpendicular to the cantilevered length of the fingers 130, remains substantially constant even after assembly. This substantially constant thickness is provided by the beneficial arrangement of having the fingers 130 in a state of bending rather than a state of compression, further promoting more consistent loading of the race inserts 104, 105 by fingers 130 due to more controlled deformation of the fingers 130.

In the illustrated embodiment, only two fingers 130 are associated with a given back surface segment 140, 144. However, in alternate embodiments of the invention, a greater or lesser number of fingers can be used, depending on the length of the back surface and the desired support and resistance during assembly.

Figure 5:
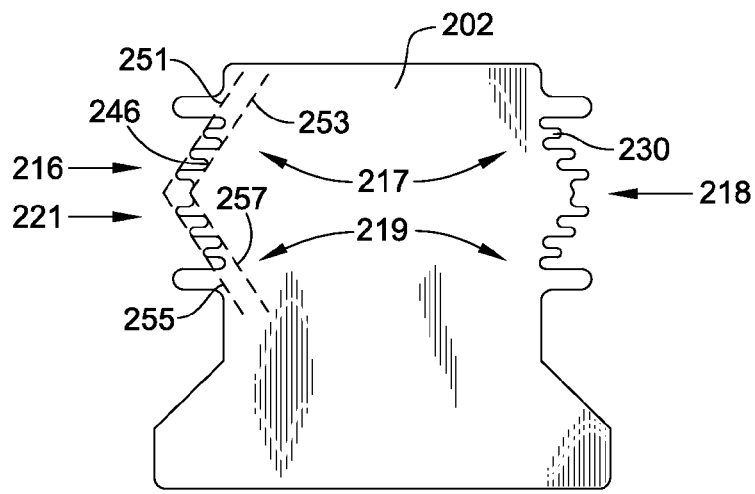
FIG. 5 is an end illustration of the base rail of the guide rail of FIG. 4.
Figure 6:
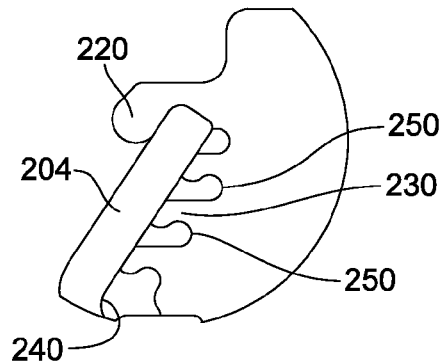
FIG. 6. is an enlarged partial illustration of the guide rail of FIG. 4, illustrating the mounting arrangement of the race insert mounted to the base rail.

In the illustrated embodiment of FIGS. 1-3, all of the fingers 130 that are associated with the first back surface segment 140 are laterally bent away from the fingers 130 that are associated with third back surface segment 140. This is because the first, and second surfaces face away from one another. However, if a different profile, such as V-profile were used, as illustrated in FIGS. 4-6, where the fingers are located internal to the V-profile, the fingers associated with one back surface segment would be laterally bent toward the fingers associated with the other back surface segment of the V-profile.

Figure 4:
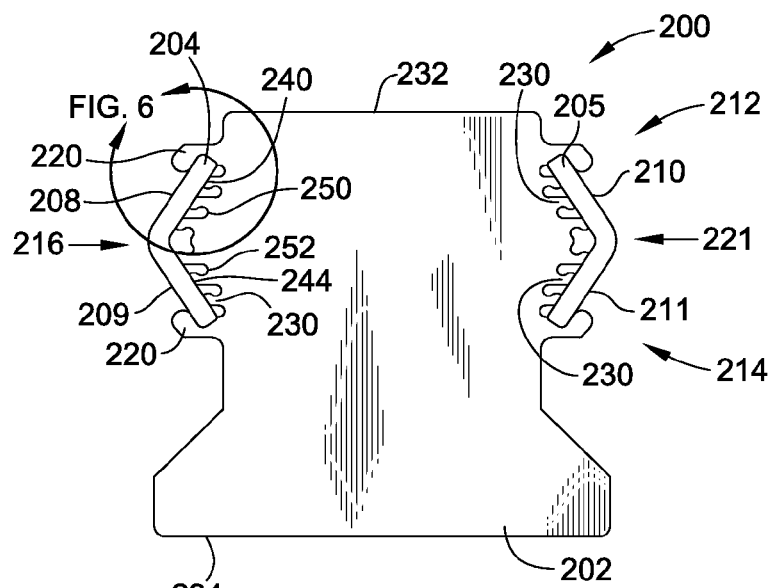
FIG. 4 is an alternate embodiment of a guide rail in accordance with the teachings of the present invention.

FIG. 4 illustrates a guide rail 200 according to the teachings of the present invention. The guide rail 200 includes a base rail 202 and a pair of race inserts 204, 205 mounted to the base rail 202. The base rail 202 is preferably formed from a lighter and/or softer material than the race inserts 204, 205. Typically, the base rail 202 is an extrusion formed from aluminum and the race inserts 204, 205 are a steel or other wear-resistant material.

In an embodiment of the invention, the race inserts 204, 205 form a V-shaped profile, which includes race ways 208-211. In this embodiment, the V-shaped race inserts 204, 205 each include two load transmission lines that extend at an angle relative to one another. These load transmission lines are illustrated by arrows 212, 214.

The race inserts 204, 205 are mounted in grooves 216, 218 formed in opposing sides of the base rail 202. The base rail 202 includes four tabs 220. The grooves 216, 218 are defined as those portions of the base rail 202 between the two tabs 220 on the left side of the base rail 202, and between the two tabs 220 on the right side of the base rail 202. In the embodiment of FIGS. 4 and 5, the shape of the grooves 216, 218 is generally convex with respect to the base rail 202. Typically, the tabs 220 are swaged over the ends of the race inserts 204, 205 to secure the race inserts 204, 205 within the grooves 216, 218. When assembling the guide rail 200, the race inserts are inserted laterally into the grooves 216, 218 along a direction illustrated generally by arrow 221.

Each of the grooves 216, 218 has a first portion 217 and a second portion 219. The grooves 216, 218 further include biasing fingers 230 such that each of the first and second portions 217, 219 includes at least one finger 230, wherein, collectively, the fingers 230 are configured to support the race inserts 204, 205. Prior to assembly of the guide rail 200, the fingers 230 extend generally parallel to one another, and parallel to the direction of insertion, i.e., arrow 221, and laterally outward from the base of grooves 216, 218. In this configuration, the fingers 230 are non-parallel with load transmission lines 212, 214.

During mounting of the race inserts 204, 205, the race inserts are inserted along the direction of arrow 221. As with the embodiment of FIG. 1, the mounting process involves applying a sufficient force to the race inserts 204, 205 to cause the fingers 230 to deform substantially under a state of bending. More particularly, the fingers 230 associated with a top portion 210 of race insert 204, 205 bend away from the top 232 of the base rail 202 and therefore deform towards the center of the race insert 204, 205. Similarly, the fingers 230 associated with a bottom portion 210 of race insert 204, 205 bend away from the bottom 234 of the base rail 202 and, therefore, deform towards the top portion 210 of the race insert 204, 205. Thus, the fingers 230 associated with the top portion 210 of the race insert 204, 205 bend toward the fingers 230 associated with the bottom portion 211 of the race insert 204, 205. During this assembly, the fingers are cammed against the back surfaces of the race inserts 204, 205 to cause the fingers to bend. In other words, the tips of the fingers contact the back surface of the race inserts 204, 205 and then as the race inserts 204, 205 are continually pushed into the grooves, the fingers 230 slide along back surface of the race inserts 204, 205 and are bent.

As explained above, placing the fingers 230 in a state of bending results in a more controlled deformation of the fingers 230, wherein the tolerancing of the race ways 208-211 is believed to be more accurately controlled. In some embodiments, the extent of bending the fingers 230 is between about 5 degrees and 35 degrees.

With respect to FIG. 5, it will be noted that the configuration of the illustrated embodiment is free of undercuts between adjacent fingers 230, which can assist in the event that the fingers 230 are machined into the base rail 202. In such an arrangement, a grinder having a rotating axis extending perpendicularly to the insertion direction 221 can be used so that all of the fingers are cut with a grinding wheel rotating in the same direction. Thus, all material for each finger will be exposed to similar machining characteristics. If undercuts were provided, the grinding wheel would have to be inserted with an axis of rotation generally parallel to insertion direction 221 such that the top portion and bottom portion of fingers 230 would be ground by opposite sides of a wheel, which can provide different machining characteristics to the fingers 230, such as material flow directions.

In the illustrated embodiment, each race insert 204, 205 includes first and second back surface segments 240, 244 (numbered and discussed in terms of race insert 204). The first and second back surface segments 240, 244 extend at non-parallel and non-perpendicular angles to each other. In the illustrated embodiment, the first and second back surface segments 240, 244 face towards one another.

Prior to deformation of fingers 230 that associate with the first back surface segment 240, a first line segment 251 passing through the tips of a portion of the fingers 230 is approximately parallel to a second line segment 253 passing through bases 250 of the fingers 230. As such, after assembly of the race insert 204, the first back surface 240 is approximately parallel to the first and second line segments 251, 253. Similarly, a third line segment 255 passing through the tips of another portion of the fingers 230 is approximately parallel to a fourth line segment 257 passing through bases 252 of the fingers 230, such that, after assembly of the race insert 204, the second back surface segment 244 is approximately parallel to the third and fourth line segments 255, 257.

As such, each of the fingers 230 extend laterally outward approximately the same distance. This distance is measured on a same side of the fingers 230 in which the fingers will be bent during insertion of the race inserts 204, 205. This arrangement promotes substantially constant bending forces throughout the various fingers 230 during assembly of the guide rail 200. This substantially constant distance is illustrated in FIG. 5. Further, because the fingers 230 are not compressed or mushroomed, the thickness of the fingers 230, perpendicular to the cantilevered length of the fingers 230, remains substantially constant even after assembly. This substantially constant thickness is provided by the beneficial arrangement of having the fingers 230 in a state of bending rather than a state of compression, further promoting more consistent loading of the race inserts 204, 205 by fingers 230.

In the illustrated embodiment, only three fingers 230 are associated with a given back surface segment 240, 244. However, in other embodiments, more or less fingers can be used depending on the length of the back surface and desired support and resistance during assembly. Further, all of the fingers 230 that are associated with the first back surface segment 240 are laterally bent towards the fingers 230 that are associated with second back surface segment 244. This is because the first and second back surface segments 240, 244 face one another.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A guide rail comprising:
   a base rail;
   at least one finger extending from a first portion of the base rail;
   at least one finger extending from a second portion of the base rail; and
   a race insert mounted against the plurality of fingers, the race insert having a first and second race way, wherein the first race way is associated with the at least one finger extending from the first portion of the base rail, and the second race way is associated with the at least one finger extending from the second portion of the base rail; and
   wherein the first and second race ways have different load transmission directions, wherein the load transmission direction of the first race way is non-parallel to the at least one finger extending from the first portion of the base rail, and the load transmission direction of the second race way is non-parallel to the at least one finger extending from the second portion of the base rail.

2. The guide rail of claim 1, wherein the at least one finger extending from the first portion of the base rail, and the at least one finger extending from the second portion of the base rail, are deformed into a state of bending by the mounting of the race insert.

3. The guide rail of claim 2, wherein the at least one finger extending from the first portion of the base rail are bent in a first direction, and the at least one finger extending from the second portion of the base rail are bent in a second direction, the first and second directions being generally away from each other.

4. The guide rail of claim 2, wherein the at least one finger extending from the first portion of the base rail are bent in a first direction, and the at least one finger extending from the second portion of the base rail are bent in a second direction, the first and second directions being generally towards each other.

5. The guide rail of claim 1, wherein the base rail includes two mounting grooves formed therein, the mounting grooves located on opposing sides of the base rail, and wherein each mounting groove includes at least one finger extending from a first portion of the mounting groove, and at least one finger extending from a second portion of the mounting groove.

6. The guide rail of claim 5, wherein the shape of the two mounting grooves is generally concave with respect to the base rail.

7. The guide rail of claim 5, wherein the shape of the two mounting grooves is generally convex with respect to the base rail.

8. The guide rail of claim 5, wherein the at least one finger extending from the first portion of the mounting groove, and the at least one finger extending from the second portion of the mounting groove, have approximately a same cantilevered length and approximately a same thickness in their deformed state that is substantially perpendicular to the cantilevered length.

9. The guide rail of claim 5, wherein the race insert has an arch-shaped profile, and wherein the top of the arch is inserted into a deepest portion of the mounting groove.

10. The guide rail of claim 5, wherein the race insert has a V-shaped profile, and wherein the vertex of the race insert faces away from the mounting groove.

11. A method of forming a guide rail comprising the steps of:
    forming, within a base rail, a first groove, wherein the first groove has a first portion and a second portion, each portion having one or more fingers extending laterally away from the first groove; and
    mounting a race insert having two race ways into the first groove such that the race insert is pressed into contact with each of the one or more fingers; and
    wherein mounting the race insert includes bending each of the one or more fingers in the first and second portions such that each of the one or more fingers is biased against the race insert.

12. The method of claim 11, wherein mounting a race insert having two race ways comprises mounting a race insert having two race ways, wherein each race way has a different load transmission direction, and wherein mounting the race insert includes inserting the race insert into the first groove along an insertion direction, the insertion direction being oblique relative to the two load transmission directions.

13. The method of claim 11, wherein the step of forming a first groove comprises forming a first groove wherein all of the one or more fingers in the first and second portions of the first groove are generally parallel to one another prior to the step of mounting.

14. The method of claim 11, further comprising the step of forming, within the base rail, a second groove, similar to the first groove, located in a side of the base rail opposite the first groove.

15. The method of claim 14, wherein forming a first and second grooves comprises forming the first and second grooves such that the shape of the first and second grooves is generally concave with respect to the base rail.

16. The method of claim 15, wherein mounting a race insert comprises mounting a race insert that is arch-shaped.

17. The method of claim 14, wherein forming a first and second grooves comprises forming the first and second grooves such that the shape of the first and second grooves is generally convex with respect to the base rail.

18. The method of claim 17, wherein mounting a race insert comprises mounting a race insert that is V-shaped.

19. The method of claim 11, wherein the step of bending each of the one or more fingers is substantially free of compressing any of the one or more fingers.

20. A guide rail comprising:
   a base rail;
   at least one finger extending from a first portion of the base rail;
   a race insert mounted against the at least one finger and deforming the finger, the race insert having a first race way and a second race way; and
   wherein the first and second race ways have different load transmission directions, wherein the load transmission direction of the first race way is non-parallel to the at least one finger, and the load transmission direction of the second race way is non-parallel to a direction the at least one finger extends from the first portion of the base rail.

21. The guide rail of claim 20, wherein the base rail includes a groove in which at least a portion of the race insert is mounted, the at least one finger formed in the groove.

22. The guide rail of claim 21, wherein the base rail includes a pair of laterally spaced apart tabs, the tabs forming the groove therebetween, the pair of tabs being swaged toward one another and over portions of the race insert to secure the race insert within the groove.

23. The guide rail of claim 22, wherein one of the tabs is swaged over a portion of the first race way and the other one of the tabs is swaged over a portion of the second race way.

24. The guide rail of claim 22, wherein the portions of the race insert over which the tabs are swaged are spaced away from the first and second race ways.

25. A method of forming a guide rail comprising the steps of:
   forming, within a base rail, a first groove, wherein the first groove has a first portion having one or more fingers extending generally perpendicular to a bottom of the first groove;
   mounting a race insert having first and second race ways into the first groove such that the race insert is pressed into contact with each of the one or more fingers;
   wherein mounting the race insert includes deforming each of the one or more fingers such that each of the one or more fingers is biased against the race insert; and
   wherein the first and second race ways having different load transmission directions, wherein the load transmission direction of the first race way is non-parallel to the one or more fingers prior to the step of deforming, and the load transmission direction of the second race way is non-parallel to the one or more fingers prior to the step of deforming.

26. The method of claim 25, wherein mounting the race insert includes inserting the race insert into the first groove along an insertion direction, the insertion direction being oblique relative to the two load transmission directions and parallel to the one or more fingers, at least prior to the step of deforming.

27. The method of claim 26, wherein the step of forming a first groove comprises forming a first groove wherein all of the one or more fingers of the first groove are generally parallel to one another and the insertion direction prior to the step of mounting.

28. The method of claim 26, further comprising the step of swaging first and second tabs that define the groove over portions of the race insert.

* * * * *